Patented May 8, 1951

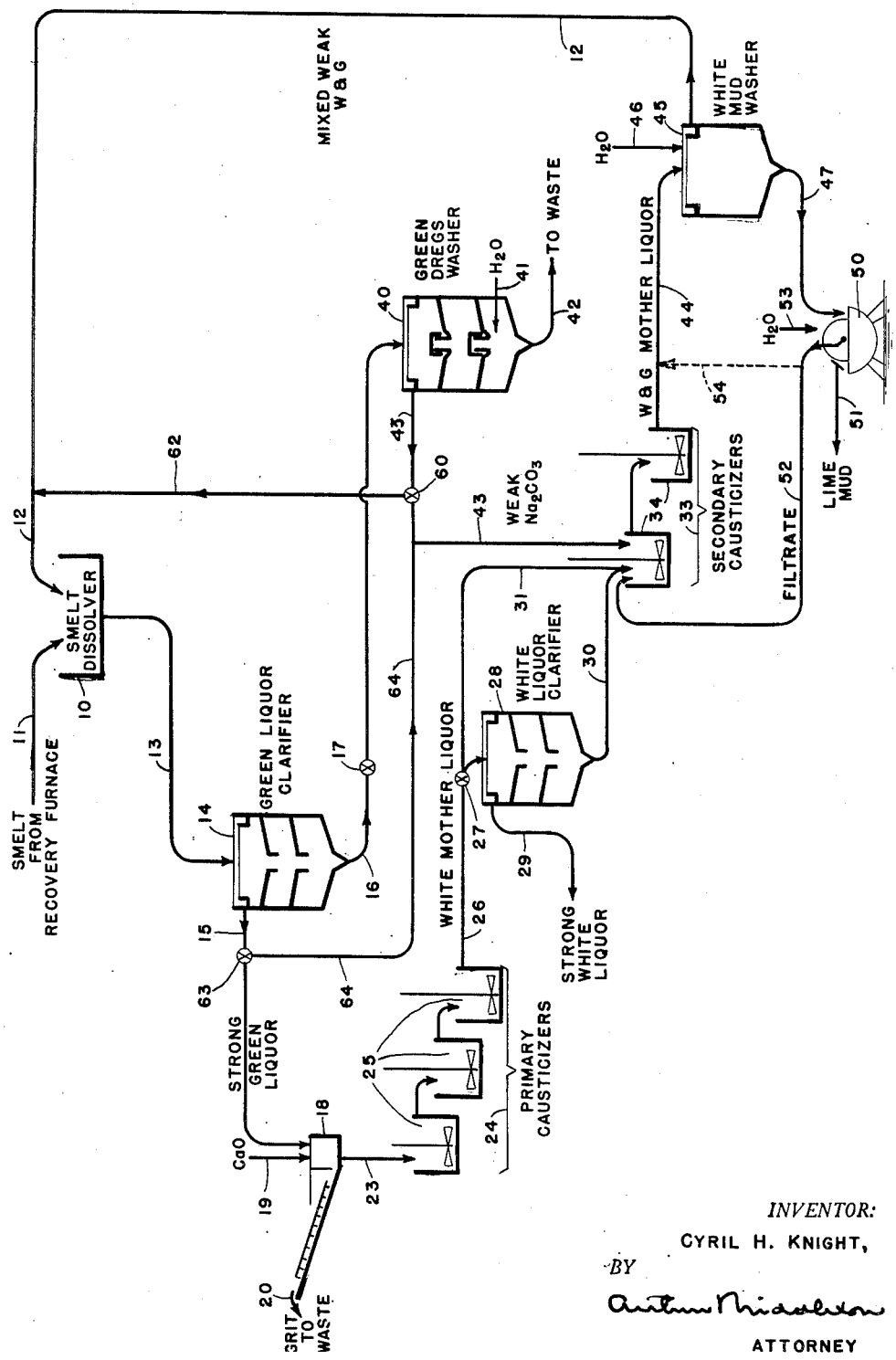

2,552,183

UNITED STATES PATENT OFFICE 2,552,183

TWO-STAGE CAUSTICIZING

Cyril H. Knight, Toronto, Ontario, Canada, assignor to The Dorr Company, New York, N. Y., a corporation of Delaware Application September 19, 1945, Serial No. 617,239
In Canada April 7, 1945

2 Claims. (Cl. 23—185)

This invention relates to the re-causticizing of kraft green liquor such as is used in the sulphate pulp process. More particularly, it relates to arrangements whereby two-stage causticizing can be practiced for contributing increased efficiency to the process at a saving in operating costs, and also at a saving in installation costs.

In the sulphate pulp process, wood pulp is digested in a caustic liquor not only for the removal of water-solubles of the wood but for rendering soluble non-cellulosic encrustations on the cellulosic fibers. The recovered liquors are then evaporated and burned in a recovery furnace. Smelt from the furnace is dissolved to produce what is called green liquor, namely, sodium carbonate ($Na_2CO_3$) with some sodium sulfide ($Na_2S$). The green liquor containing principally sodium carbonate ($Na_2CO_3$) and sodium sulphide ($Na_2S$) must be converted into white liquor containing sodium hydroxide (NaOH) plus the original more or less constant content of $Na_2S$. This is accomplished by "causticizing" with calcium hydroxide ($Ca(OH)_2$), which is realized by reacting $Ca(OH)_2$ with the $Na_2CO_3$ to yield NaOH in solution and a precipitate predominantly $CaCO_3$ but with some unreacted $Ca(OH)_2$. The mother liquor (unclarified white liquor) is fractionated to yield strong clarified white liquor suitable for use in the digester, and a mud of the residual solids. These are usually washed and filtered with the filtrate re-used in the process. The green liquor is also usually clarified by fractionation to remove dregs therefrom prior to use of the green liquor in reacting it with lime in the causticizing step.

In the causticizing step all of the lime never reacts with the $Na_2CO_3$ of the green liquor in that the reaction reaches equilibrium before all the lime is used up so that when clarified causticized white liquor is decanted from its mud, it inevitably has a significant content of unreacted lime ($Ca(OH)_2$) mixed with the preponderant calcium carbonate. In order to avoid loss of this lime and to make effective use of it, this invention proposes to re-causticize this mixture of $CaCO_3$ and $Ca(OH)_2$ with weak green liquor ($Na_2CO_3$) decanted from the green liquor dregs-washing station in a secondary causticizing station. Here the $NaCO_3$ is in excess of the $Ca(OH)_2$, so that practically all the lime is thus used up. The resulting secondary causticized mixture is then washed and filtered, decanted liquor being recycled back to the smelt-dissolving station and the filter cake going possibly to a lime-reburning station.
In the causticizing step the sodium carbonate is never completely converted into sodium hydroxide because the causticizing reaction described is reversible and eventually reaches equilibrium. The completeness of conversion to sodium hydroxide from sodium carbonate depends principally on the concentration of sodium carbonate in the original green liquor and it decreases rapidly with increasing concentration of sodium carbonate. The conversion is also influenced to a lesser degree by the concentration of sodium sulphide, sodium sulphate and other minor constituents. For the conversion to proceed to the limits of this equilibrium the solution must be kept saturated in respect to calcium hydroxide $Ca(OH)_2$. Calcium hydroxide is sparsely soluble and it dissolves rather slowly from the solid form in which it is present in the slurry, and therefore, to be sure of maximum concentration of dissolved $Ca(OH)_2$ in practice it is necessary to add more calcium hydroxide to the causticizer than can be used up in the conversion reaction. Under ideal conditions for utilization of calcium hydroxide and given sufficient time to complete the reaction, the conversion can theoretically be made to proceed to the equilibrium limits, with only the slightest excess of calcium hydroxide, but in commercial practice with reaction time limited and other factors modified in line with economic necessity and to allow for variations in quality of the lime and green liquor strength, it is customary to maintain a very considerable excess of calcium hydroxide in the slurry amounting to as much as 20% in many cases. In commercial practice the use of increasing excess of calcium hydroxide results in more nearly approaching the equilibrium limits of conversion, but as this excess can not be used up the benefits of increased conversion must be balanced against the increased cost of the excess lime. Therefore, when clarified causticized white liquor is decanted from its mud the latter inevitably has a significant content of unreacted calcium hydroxide mixed with the preponderant calcium carbonate. In order to allow the use of a large excess of lime and thus obtain conversion approaching equilibrium and yet still avoid the loss of lime by making effective use thereof, this invention proposes to re-causticize this mixture of calcium carbonate and calcium hydroxide with weak green liquor decanted from the green liquor dregs washing station in the secondary causticizing station.

The white mud remaining after decantation of clarified causticized white liquor in the primary thickener has entrained in it white liquor of similar strength and composition to the decanted white liquor. Since as described previously, the completeness of the conversion reaction increases with decreasing concentration of sodium compounds in the liquor, if this mud were repulped with hot water and agitated for a period of time more of the sodium carbonate present would be converted to sodium hydroxide, thus using up part of the excess calcium hydroxide present in the white mud. If this white mud be repulped and agitated with weak green liquor the same effect will be obtained whereby dilution of the original entrained white liquor allows the conversion to proceed further, and in addition, the sodium carbonate content of the diluting weak green liquor itself will react with more of the excess calcium hydroxide. This invention proposes to carry out the secondary stage of causticizing in weak green liquor to take advantage of this further reaction of the original entrained white liquor upon dilution thereof.

The slurry resulting from the secondary causticizing must be settled in a secondary thickening station with the decanted partly causticized liquor going to the dissolving tanks. The resultant remaining settled white mud has entrained therein a portion of the partly causticized liquor which may be removed by washing on a continuous filter. If the secondary causticizing were carried out in strong green liquor the total quantity of soda entrained in the mud from the secondary thickening stage would be greater than is the case where weak green liquor is used. Consequently, to wash the mud down to a point where it can be reburned or economically discarded would involve the use of another thickening station ahead of the filter, if strong green liquor were used in the second stage. This invention therefore proposes to carry out the secondary stage of causticizing in weak green liquor to take advantage of the fact that one less thickening station can be used in washing the lime mud free from soda to a point where it can be reburned or economically discarded to waste.

The arrangement and details of the washing and decanting of the white mud in its washing station embodies features of advantage of this invention. Other such features are involved and they will be pointed out as the description of the invention proceeds.

The invention is illustrated in the accompanying drawings which indicate the best embodiment of the invention now known to me, but these are shown for illustrative purposes and not as limitations for, obviously, the invention is capable of other embodiments, the criteria and ambit of which are defined in the accompanying claims.

In the drawings, the figure shows a flow-chart or flow-sheet indicating a complete embodiment of this invention, in which chart the apparatus used is shown symbolically, with single lines to represent piping and other connections.

In the drawings, 10 indicates a smelt-dissolver tank or station to which are supplied through a conduit or pathway 11, smelt from the recovery furnace (not shown) and mixed weak white and green liquor, which comes to the smelt remover through conduit or pathway 12 from a place hereinafter described. Dissolved smelt passes through pipe or conduit 13 to a green liquor tray clarifier 14 of the balanced tray clarifier type, such as is shown in U. S. A. patent to Weber, No. 1,770,353, having a clarified effluent pipe or conduit 15 and a sludge or mud underflow conduit 16 provided with a control valve 17. Clarified strong green liquor passes through pipe 15 to a lime slaker 18, to which lime (CaO) is supplied through pathway 19. Grit from the mixture in the slaker 18 is passed to discharge at the outlet 20; while slaked lime ($Ca(OH)_2$) and green liquor ($Na_2CO_3$) pass through conduit or pathway 23 to a primary causticizing station 24 made up of a plurality of agitators 25, from which reaction-product white-mother liquor ($NaOH+Na_2S$) passes through conduit or pathway 26, having a control valve 27, into a balanced tray clarifier 28 equivalent to U. S. A. patent to Weber, No. 1,770,353. From this clarifier 28 there is discharged as clarified effluent strong white liquor through conduit or pathway 29, which liquor is suitable for use in the digestion of the cellulosic or woody material. Thickened under-flow of the precipitate sedimented out of the white mother liquor, passes from the clarifier 28 as sludge or mud through the under-flow conduit or pathway 30 leading to the secondary causticizer station 33, made up of a plurality of agitators 34. White mother liquor in pipe 26 can be controlled by valve 27 for a quantity thereof to pass through pipe 31 to the secondary causticizing station 33, should such be desirable.

Underflow sludge or mud from the green liquor clarifier 14, passing as underflow through the underflow conduit 16 past the valve 17, is led to a green-dregs washer 40, equivalent to a washing type tray thickener. The washer as diluent or washing fluid such as water fed thereto through a pipe or conduit 41. Washed green liquor dregs in the form of mud or sludge passes as underflow through conduit or pathway 42, leading from the dregs washer 40 to waste. Clarified weak green liquor ($Na_2CO_3$ plus some $Na_2S$) is passed from the dregs washer 40 through conduit or pathway 43 to the secondary causticizing station 33.

From the secondary causticizing station 33 there is passed through conduit or pathway 44 a mixed white and green mother liquor, which is received in white-mud washer 45, to which diluent fluid such as wash water is supplied through conduit or pathway 46. Clarified mixed weak white and green liquor is discharged from the white-mud washer 45 through effluent conduit or pathway 12 leading to the smelt dissolver 10. The white-mud washer 45 can be a washing tray thickener or a balanced tray thickener, but preferably is of composite construction, shown and described in my pending Canadian patent application Serial No. 525,327. Washed mud or sludge comprising precipitate entrained in the white and green mother liquor coming to the washer 45 through the conduit 44, passes from the washer 45 as underflow mud or sludge through the conduit or pathway 47, through which it is conducted to a filter station 50, from which lime ($CaCO_3$) is discharged as filter cake through pathway 51, while filtrate is conducted from the filter station 50 through pathway or conduit 52 to be supplied to the secondary causticizing station 33. Wash water for the filtration operation in the filter station 50 is supplied through the conduit 53, and there is an elective branch line 54 from the filtrate conduit 52, leading a controlled quantity of filtrate to the white and green mother-liquor pipe 44, passing from the secondary causticizing station 33 to the white-mud washer 45.

In another arrangement of piping, the weak green liquor in pipe 43 carrying effluent from the green dregs washer 40, can be passed through pipe 62, through the controlling medium of valve 60, to flow into the smelt dissolver 10. Concurrently, strong green liquor from pipe 15, through the controlling medium of valve 63, can be passed through pipe 64 to join pipe 43 for being thus conducted to the secondary causticizing station 33.

In operation, dissolved smelt mixture from the dissolver 10 passes through pipe 13 to the green liquor clarifier 14. Strong green liquor decanted from the clarifier 14 is passed through pipe 15 to lime slaker 18, where it is mixed with lime and the slaking operation is completed. The slaked mixture is passed through pipe 23 to the primary causticizing station 24, where the reaction takes place to convert the sodium carbonate of the green liquor and the calcium hydroxide of the slaked lime into white mother liquor, comprising essentially strong white liquor of sodium hydroxide and precipitate comprising calcium carbonate as its major constituent and calcium hydroxide as its minor constituent. Clarifier liquor from the mother liquor is decanted from the white-liquor clarifier 28 and passes therethrough as strong white liquor through pipe 29, while precipitate from the mother liquor passes as mud or sludge containing some unreacted calcium hydroxide to the secondary causticizing station 33. Here it is joined with weak green liquor comprising essentially sodium carbonate, passing thereto through pipe 43 as decanted clarified weak green liquor from the green-dregs washer 40. This washer 40 receives underflow through pipe 16 from the green-liquor clarifier 14. Washing of this liquor is effected in the washer 40 by washing liquor or water fed thereto through pipe 41. Washed green dregs are passed to waste as underflow from the washer 40 through the pipe 42. The valve 17 in pipe 16 can control the proportioning of the liquor decanted through pipe 15 going to the lime slaker 18.

In the primary causticizing station 24 there is an excess of calcium hydroxide over sodium carbonate, because these two chemical reactants normally reach equilibrium in their reaction under conditions whereby there is a residue of unreacted calcium hydroxide; but in the secondary causticizing station 33 the reverse takes place, namely, all of the residual calcium hydroxide is reacted with the excess of sodium carbonate passing to that station through the pipe 43 as decanted effluent from the green-dregs washer 40 so that the white and green mother liquor passing through pipe 44 from the secondary causticizing station 33 contains no significant quantity of unreacted lime. The sodium sulfide content of the liquors remains substantially constant and unaffected, by this treatment just described, so its presence can be ignored, in so far as the foregoing chemical reactions are concerned.

The feature of advantage of the operations just described is that lime is used efficiently and none left in unreacted form, even though a very considerable excess of $Ca(OH)_2$ over $Na_2CO_3$ is maintained in the primary causticizing stage in order to ensure a maximum possible conversion of $Na_2CO_3$ to NaOH within the equilibrium limits of the causticizing reaction; that two-stage causticizing takes place in a plan that uses not more than four tray-thickeners or equivalent liquid-solids separating devices so that there is a saving not only in ground space, but in installation cost as well.

As an alternative arrangement, but not nearly the practical or economic equal of the foregoing, weak green liquor overflowing from the green dregs washer 40 is passed through pipe 62 to the smelt dissolver 10. A minor part of the strong green liquor overflowing from the green liquor clarifier 14, through pipe 15, is diverted by valve 63 to pass through pipe 64 and pipe 43 into the secondary causticizer station 33, where this minor fraction strong green liquor is diluted with filtrate from the filter 50, flowing to the secondary causticizing station 33 through pipe 52.

I claim:

1. In the continuous re-causticizing of green liquor derived from a smelt dissolving station, clarifying such green liquor to remove dregs therefrom, decanting weak green liquor from which such dregs have been washed, primarily causticizing such clarified green liquor with an excess of lime to yield a white mother liquor containing NaOH and a precipitate, decanting strong white clarified liquor therefrom and discharging thickened precipitate containing a minor fraction of $Ca(OH)_2$, secondarily causticizing such thickened precipitate with such decanted weak green liquor containing $NaCO_3$ in excess of the $Ca(OH)_2$ of the precipitate to yield a mixed white and green mother liquor, decanting therefrom a clarified weak mixed white and green liquor from which its white mud precipitate has been washed, recycling such decanted weak mixed white and green liquor to the smelt dissolving station, filtering such white mud precipitate, and recycling filtrate therefrom to the secondary causticizing step, said decanted strong white liquor is discharged as the end product strongly causticized liquor and of a sodium hydroxide concentration equivalent to that in the primary causticizing step since all excess lime issuing from the primary causticizing step is absorbed by weak green liquor in the secondary causticizing step and carried back through the system to the smelt dissolving station, whereby such liquor is partly converted to sodium hydroxide before re-reaching the primary causticizing step where its excess and entrained lime aids in the liming operation.

2. In the continuous re-causticizing of green liquor derived from a smelt dissolving station, clarifying such green liquor to remove dregs therefrom decanting strong green liquor from such dregs, decanting weak green liquor from which such dregs have been washed, primarily causticizing such clarified liquor with an excess of lime to yield a white mother liquor containing NaOH and a precipitate, decanting strong white clarified liquor therefrom and discharging thickened white precipitate, secondarily causticizing such thickened white precipitate with either or both of such decanted strong green liquor and such decanted weak green liquor, decanting therefrom a clarified weak mixed white and green liquor from which its white mud prepicitate has been washed, recycling such decanted weak mixed white and green liquor to the smelt dissolving station, filtering such white mud precipitate, and recycling filtrate therefrom to the secondary causticizing step, said decanted strong white liquor is discharged as the end product strongly causticized liquor and of a sodium hydroxide concentration equivalent to that in the primary causticizing step since all excess lime issuing from the primary causticizing step is absorbed by weak green liquor in the secondary causticizing step and carried back through the system to the smelt dissolving station, whereby such liquor is partly converted to sodium hydroxide before re-reaching the primary causticizing step where its excess and entrained lime aids in the liming operation.

CYRIL H. KNIGHT.

REFERENCES CITED

The following references are of record in the file of this patent:

UNITED STATES PATENTS

| Number | Name | Date |
|---|---|---|
| 1,691,511 | Bates | Nov. 13, 1928 |
| 2,062,255 | Brooks et al. | Nov. 24, 1936 |
| 2,211,908 | O'Connor | Aug. 20, 1940 |